United States Patent [19]

Todd et al.

[11] Patent Number: 5,560,267
[45] Date of Patent: Oct. 1, 1996

[54] CAMSHAFT VIBRATION DAMPER

[75] Inventors: Kevin B. Todd, Freeville, N.Y.; Francis B. Robbins, Carol Stream; Alan L. Miller, Dixon, both of Ill.

[73] Assignee: Borg-Warner Automotive, Inc., Sterling Heights, Mich.

[21] Appl. No.: 263,320

[22] Filed: Jun. 21, 1994

[51] Int. Cl.[6] .................................................. F16F 7/116
[52] U.S. Cl. .......................... 74/604; 74/573 R; 74/574; 74/603; 123/90.31
[58] Field of Search .................. 74/573 R, 574, 74/595, 603, 604; 123/90.17, 90.31; 192/56 R; 464/46

[56] References Cited

U.S. PATENT DOCUMENTS

| | | | |
|---|---|---|---|
| 1,640,634 | 8/1927 | Wise | 123/192 |
| 2,235,160 | 3/1941 | Ljungstrom | 123/192 |
| 3,468,190 | 9/1969 | Sampietro | 74/604 |
| 4,677,948 | 7/1987 | Candea | 123/192 B |
| 4,683,849 | 8/1987 | Brown | 123/192 B |
| 4,688,528 | 8/1987 | Nivi et al. | 123/192 B |
| 4,712,436 | 12/1987 | Brown | 74/44 |
| 4,776,442 | 10/1988 | Young | 192/56 R |
| 4,781,156 | 11/1988 | Berger et al. | 123/192 R |
| 4,926,810 | 5/1990 | Diehl et al. | 123/192 B |
| 5,040,500 | 8/1991 | Reece | 123/90.31 |
| 5,044,333 | 9/1991 | Fuchigami et al. | 123/192 B |
| 5,083,535 | 1/1992 | Deschler et al. | 123/192.2 |
| 5,272,937 | 12/1993 | Brosowske et al. | 123/90.31 |

OTHER PUBLICATIONS

Hans Kolstee, Motion and Power, © 1982 p. 90 lines 16–17 and p. 105 lines 23–25.
Simon K. Chen and Thomas Chang, SAE Techical Paper No. 861226—Crankshaft Torsional and Damping Simulation—An Update and Correlation with Test Results—1986.

Primary Examiner—Rodney H. Bonck
Assistant Examiner—Chong H. Kim
Attorney, Agent, or Firm—Willian Brinks Hofer et al.; Greg Dziegielewski

[57] ABSTRACT

A camshaft vibration damper comprises an inertia ring having a friction clutch surface disposed in driving contact with a complementary clutch surface and a spring for biasing the clutch surfaces toward one another. The complementary clutch surface may be disposed on a drive member, for example, a camshaft sprocket or similar structure rotating with the camshaft. The spring is a compression spring, preferably a Belleville spring washer, which biases the two friction clutch surfaces together. The inertia of the inertia ring opposes the instantaneous variations in rotational speed ($d\theta/dt$) of the camshaft causing relative rotation between the inertia ring and the drive member thereby reducing vibration without resisting camshaft rotation. Relative motion at the clutch face between the inertia ring and the drive member results in energy absorption and dissipation thereby minimizing unwanted vibration. Such energy adsorption is a function of: the moment of inertia of the inertia ring, the coefficient of friction of the clutch interface and the biasing force provided by the Belleville spring washer.

26 Claims, 3 Drawing Sheets

CAMSHAFT VIBRATION DAMPER

BACKGROUND OF THE INVENTION

The invention relates generally to dampers for minimizing vibration associated with impulse speed variation of rotating shafts and, more specifically, dampers for camshafts of internal combustion engines.

The development of smaller displacement, lighter internal combustion engines which typically operate at higher speeds than previous designs has produced engines which, while far more efficient, tend to run less quietly and smoothly than their predecessors. The heavy cast iron block of many prior internal combustion engines inherently functioned as an inertial damper due to its relatively large mass. Vehicle weight reduction campaigns have not overlooked this mass as a target for weight saving and not only less material but also lighter material such as aluminum now frequently comprises the engine block.

A complicating factor of vibration control is the wide R.P.M. range of modern engines which may vary from 800 R.P.M. at idle to 8000 R.P.M. at redline. Such wide operating ranges render vibration control increasingly difficult as a solution effective at 1500 R.P.M. may exacerbate vibration at 3000 or 6000 R.P.M. The problem is also particularly acute with engines having four cylinders but typically reduces in magnitude as the number of cylinders increases.

Accordingly, and especially with regard to four cylinder engines, significant attention has been paid to rotational perturbations of the crankshaft resulting from combustion within the cylinders and piston acceleration and deceleration. Many ancillary devices have been incorporated into internal combustion engines to compensate for these perturbations and provide smoother operation. Internally, these devices take the form of counter- rotating balance shafts, Lanchester dampers and harmonic balancers. Externally, fluid engine mounts and engine mounts having adjustable damping characteristics have been utilized.

For example, U.S. Pat. Nos. 4,683,849 and 4,712,436 teach crankshaft balancing devices wherein weights are disposed on counter-rotating shafts. U.S. Pat. No. 4,688,528 teaches an internal combustion engine wherein reciprocating balance weights are disposed for translation between two rotating cams which are driven by either the crankshaft or cam shaft. U.S. Pat. No. 4,677,948 discloses an engine balancing device comprising a pair of counter-rotating shafts disposed parallel to and below the engine crankshaft. Earlier internal combustion engine crankshaft balancing schemes are disclosed in U.S. Pat. Nos. 2,235,160 and 3,468,190.

U.S. Pat. No. 4,781,156 discloses an engine crankshaft balancer which incorporates a balancing mass suspended from the crankshaft main bearing caps on rods or bolts. U.S. Pat. No. 4,926,810 discloses a generally similar balancing construction. U.S. Pat. No. 5,083,535 teaches a compensating device for use in five cylinder in-line engines including pairs of counter-rotating balance wheels driven by the crankshaft.

The foregoing patents reveal that significant attention has been paid to canceling unwanted vibratory motion and providing improved overall operating balance of internal combustion engines but that the crankshaft has been the prime focus of such attention.

Believing that significant room for improvement exists, further examination of the sources of unwanted vibration in internal combustion engines has been undertaken by the inventors. Such examination has focused on the vibratory characteristics of the camshafts and on means and methods of minimizing and eliminating such vibrations. The present invention is directed to a device which reduces vibration generated by camshafts which result from the intermittent positive and negative torques associated with the opening and closing of valves and thus is capable of improving the operating smoothness of an internal combustion engine.

SUMMARY OF THE INVENTION

A camshaft vibration damper assembly comprises an inertia ring having a friction clutch surface disposed in driving contact with a complementary clutch surface and a spring for biasing the clutch surfaces toward one another. The complementary clutch surface may be disposed on a drive member, for example, a camshaft sprocket or similar structure rotating with the camshaft. The spring is a compression spring, such as a Belleville spring washer, which biases the two friction clutch surfaces together. The inertia of the inertia ring opposes the instantaneous variation in rotational speed ($d\theta/dt$) of the camshaft causing relative motion between the inertia ring and the drive member thereby reducing vibration without resisting camshaft rotation.

Relative motion at the clutch face between the inertia ring and the drive member results in energy dissipation and is a function of: the moment of inertia of the inertia ring, the coefficient of friction of the clutch interface and the biasing force provided by the Belleville spring washer. Primarily through selection of the spring force, the rotational acceleration necessary to cause slip at the clutch interface may be adjusted to provide optimum damping of various camshaft fundamental and harmonic vibrations related to various camshaft rotational speeds. The moment of inertia of the inertia ring may also be varied to further adjust the performance window.

Dampers according to the present invention exhibit broad tuning, that is, provide vibration damping over wide camshaft R.P.M. ranges because their energy adsorption is related primarily to speed changes (acceleration and deceleration), not speed itself, making them especially suited for service in vehicular internal combustion engines.

Thus it is an object of the instant invention to provide a vibration damper for reducing vibration associated with camshaft rotation in an internal combustion engine.

It is a further object of the present invention to provide a camshaft vibration damper which provides improved smoothness of engine operation over a wide range of operating speeds.

It is a still further object of the present invention to provide a camshaft vibration damper comprising essentially four components: an inertia ring having a planar face, a drive member having a complementary planar face, clutch facing material disposed on one of the planar faces and a spring for biasing the clutch faces of the inertia ring and the drive member together.

It is a still further object of the present invention to provide a camshaft vibration damper exhibiting broad tuning that provides vibration damping over a relatively broad range of engine speeds.

It is a still further object of the present invention to provide a camshaft vibration damper which provides improved operating characteristics and reduced size relative to pure inertial dampers.

It is a still further object of the present invention to provide a camshaft vibration damper which is rugged and of simple construction.

Further objects and advantages of the present invention will become apparent by reference to the following description of the preferred embodiment and appended drawings.

DESCRIPTION OF THE PREFERRED EMBODIMENT

Figure 1:
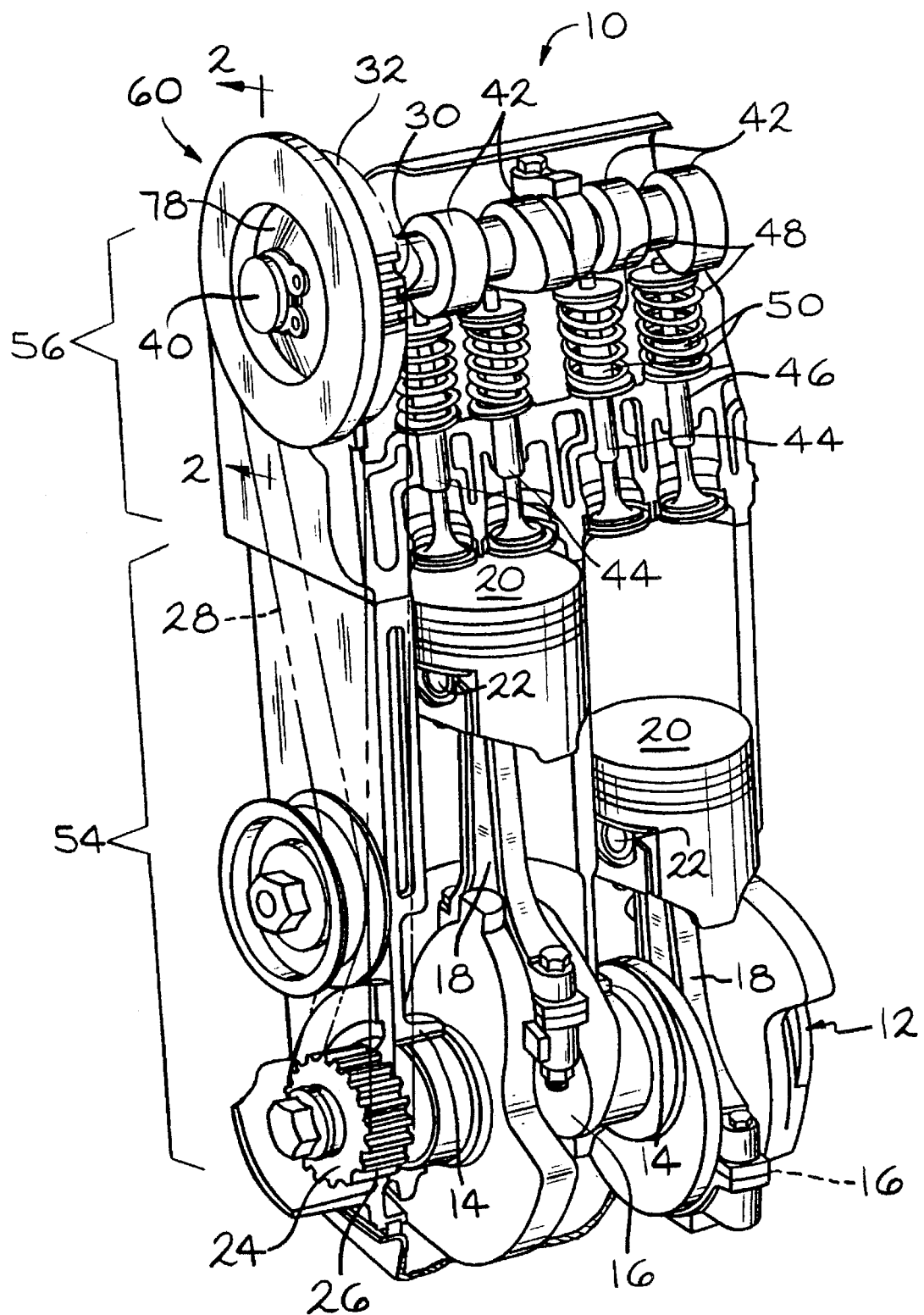
FIG. 1 is a diagrammatic, perspective view of a portion of the internal components of a typical internal combustion engine including pistons, crankshaft, valves and camshaft on which a camshaft vibration damper according to the present invention is disposed.

As illustrated in FIG. 1, a typical conventional internal combustion engine 10 of the overhead camshaft type includes a crankshaft 12 received for rotation within a plurality of journal bearings 14 and including a plurality of spaced apart cranks 16 which freely, pivotally receive a like plurality of connecting rods 18 which in turn are pivotally connected to a like plurality of pistons 20 by suitably disposed wrist pins 22. A drive sprocket 24 disposed at the forward end of the crankshaft 12 includes a plurality of teeth 26 which engage and drive a timing belt 28. The timing belt 28 engages and drives a similarly configured plurality of teeth 30 on a camshaft drive sprocket 32.

Figure 2:
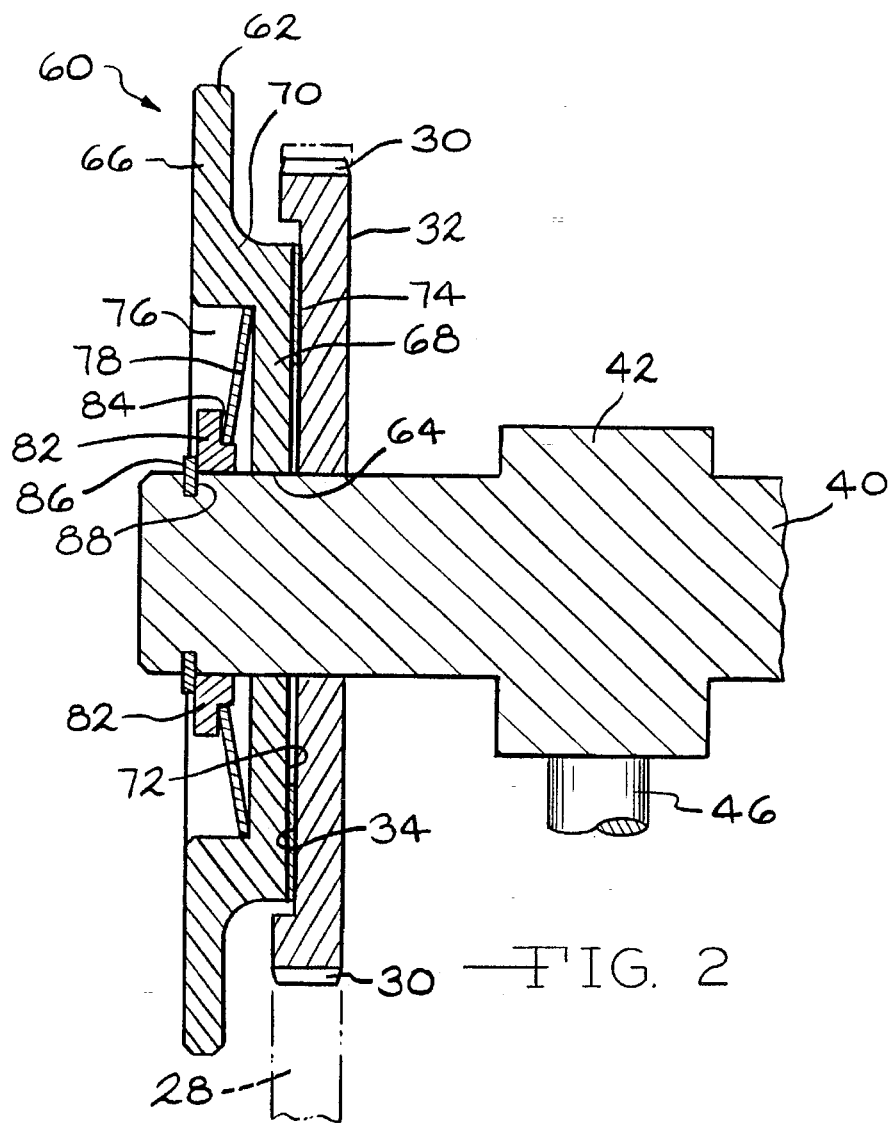
FIG. 2 is a full, sectional view of a camshaft vibration damper according to the present invention taken along line 2—2 of FIG. 1.

As illustrated in FIG. 2, the camshaft drive sprocket 32 includes a circular, planar friction surface 34 and is securely coupled to a camshaft 40 by any suitable fastening means such as friction fit, weldment, splines, keyways or other suitable means.

Referring again to FIG. 1, the camshaft 40 includes pairs of spaced apart cams 42 associated with each of the pistons 20 and more specifically with pairs of intake and exhaust valves 44. Each of the valves 44 includes a valve stem 46 having a flat terminus which contacts the aligned surface of a respective cam 42. Associated with each of the intake and exhaust valves 44 are valve springs 48 and valve guides and seals 50. Rotation of the camshaft 40 and the cams 42 therewith thus causes sequenced, axial reciprocation of the valves 44 in timed relationship with the rotation of the crankshaft 12 and reciprocation of the pistons 20 as will be readily appreciated. All of the aforementioned components are disposed within suitably and conventionally configured and arranged regions of an engine block 54 and a cylinder head 56 of the typical internal combustion engine 10.

Referring again to FIG. 2, a camshaft vibration damper assembly 60 is illustrated and includes an inertia ring 62 which is freely rotatably received upon the camshaft 40 adjacent the camshaft drive sprocket 32. As such, the inertia ring 62 includes a centrally disposed circular aperture 64 having a diameter just slightly larger than the diameter of the camshaft 40. The inertia ring 62 preferably defines a top-hat or staggered diametral configuration having an outer, larger diameter region 66 axially offset from a smaller diameter inner region 68, which defines the aperture 64, by an axially extending intermediate offset region 70. The larger diameter region 66, due to its relative mass and distance from its center of rotation, is the feature which primarily accounts for the inertia of this system.

The inertia ring 62 also includes a circular, planar face 72 which is disposed adjacent and in opposed, facing relationship with the planar, friction surface 34 of the camshaft drive sprocket 32. A circular band of frictional material 74 is secured to the circular, planar surface 72 of the inertia ring 62 by any suitable fastening means, preferably a layer of adhesive. The frictional material 74 may be any conventionally used clutch facing or like product having a stable coefficient of friction and good service life characteristics. The frictional material 74 is disposed in opposing contact with the planar, friction surface 34 and provides stable, long wearing slip clutch action between the camshaft drive sprocket 32 and the inertia ring 62 as will be more fully described below. It will be appreciated that the locations of the planar, friction surface 34 and the frictional material 74 may readily be exchanged, if desired, such that the frictional material 74 is secured to the camshaft drive sprocket 32 and the inertia ring 62 includes the planar, friction surface 34.

It should also be noted that the disposition of the inertia ring 62 adjacent the drive sprocket 32 and location of the planar, friction surface 34 on one face of the drive sprocket 32 as shown is the preferred embodiment. However, it should be appreciated that the planar, friction surface 34 may be disposed on any conveniently available or added component which rotates with the camshaft 40 such as a disc or wheel clutch member or one (or more) of the cams 42 with the inertia ring 62 disposed thereadjacent.

The opposite face of the inertia ring 62 defines a circular recessed region 76. A Belleville spring washer 78 is disposed within the recess and biases the inertia ring 62 toward the camshaft drive sprocket 32. While a Belleville spring is the preferred means of providing bias to the inertia ring 62 due to its compactness and relatively high spring rate, it should be understood that other biasing means such as a coil spring or solid elastomeric spring device may be utilized. The Belleville spring washer 78 is supported upon and concentrically disposed about a notched annular retainer 82. The retainer 82 is L-shaped in cross section, the radially extending surface 84 providing a stop against which the Belleville spring washer 78 reacts. The retainer 82 is, in turn, maintained in its axial position by a snap ring 86 which is seated within a complimentarily configured circumferential groove 88 formed in the camshaft 40. Convenient adjustment of the force provided by the Belleville spring washer 78 may be achieved by substituting various annular retainers 82 having different axial thickness, i.e., the distance between the surface 84 and the face which engages the snap ring 86.

Operation of the camshaft vibration damper assembly 60 will now be described, first on a qualitative basis and, then with graphs showing relative harmonic improvement and finally with a specific, typical numerical example.

Figure 3:
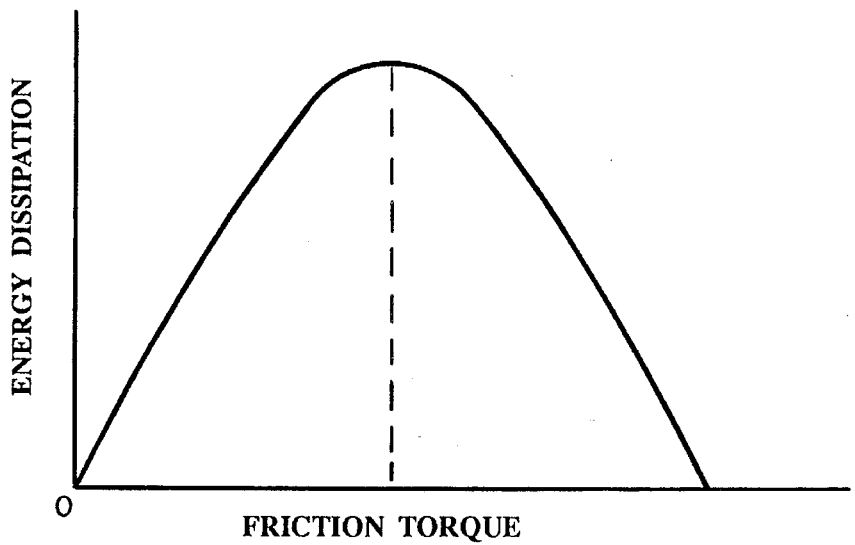
FIG. 3 is a qualitative graph relating energy dissipation in a camshaft vibration damper according to the present invention to friction torque at the clutch face.

Referring now to FIG. 3, a simplified, qualitative graph of one performance aspect of a camshaft vibration damper according to the present invention is illustrated. The graph is plotted qualitatively with energy dissipation along the vertical (y) axis and with friction torque plotted qualitatively along the horizontal (x) axis. In the abstract, that is, without reference to a particular engine operating parameter such as speed, the goal of a camshaft vibration damper is typically maximum energy dissipation as this condition in a rotating, vibrating system generally correlates with the maximum absorption of transient vibratory events and thus minimum vibration and improved smoothness of operation. Accordingly, it is generally desirable to achieve the greatest energy dissipation possible in any given damper system including the camshaft vibration damper of the present invention. The graph of FIG. 3 shows performance for a given inertia ring 62 of unspecified mass and moment of inertia.

Initially, the energy dissipation is zero when the friction torque is zero. This is true because when there is no friction torque, i.e. no frictional coupling, between the inertia ring 62 and the camshaft 40 through the frictional coupling afforded by the frictional material 74 contacting the adjacent the planar friction surface 34 of the camshaft drive sprocket 32, the inertia ring 62 simply free wheels on the camshaft 40 and, for all intents and purposes, has no dynamic or damping affect on the camshaft 40 aside from its action, to whatever extent, as a flywheel. As the friction torque is increased by increasing the spring rate of the Belleville spring washer 78, moving the retainer ring 82 toward the inertia ring 62, or increasing the coefficient of friction between the camshaft drive sprocket 32 and frictional material 74 by adjusting the composition of the material 74 or surface treatment of the surface 34, frictional coupling, energy transfer between the camshaft drive sprocket 32 and the inertia ring 62 increases and thus energy absorption and dissipation increases.

The energy absorbed typically results from impulses which are rotational speed aberrations of the camshaft 40 related to the action of the cams 42 as they reciprocate the valves 44 against the biasing force of the valve springs 48. These inpulses cause slip at the clutch interface which generates heat which is then absorbed and dissipated. Optimum damping is achieved at that combination of moment of inertia of the inertia ring 62, spring force provided by the Belleville spring washer 78 and coefficient of friction between the frictional material 74 and camshaft drive sprocket 32 which achieves maximum energy absorption and dissipation. This configuration may be empirically or experimentally determined. As friction torque increases further, the inertia ring 62 becomes increasingly tightly coupled to the camshaft and ultimately becomes positively coupled to it and thus rotates with it. The damping effect of the camshaft vibration damper assembly 60, except for the flywheel action of its mass, thus approaches and eventually equals zero.

Figure 4:
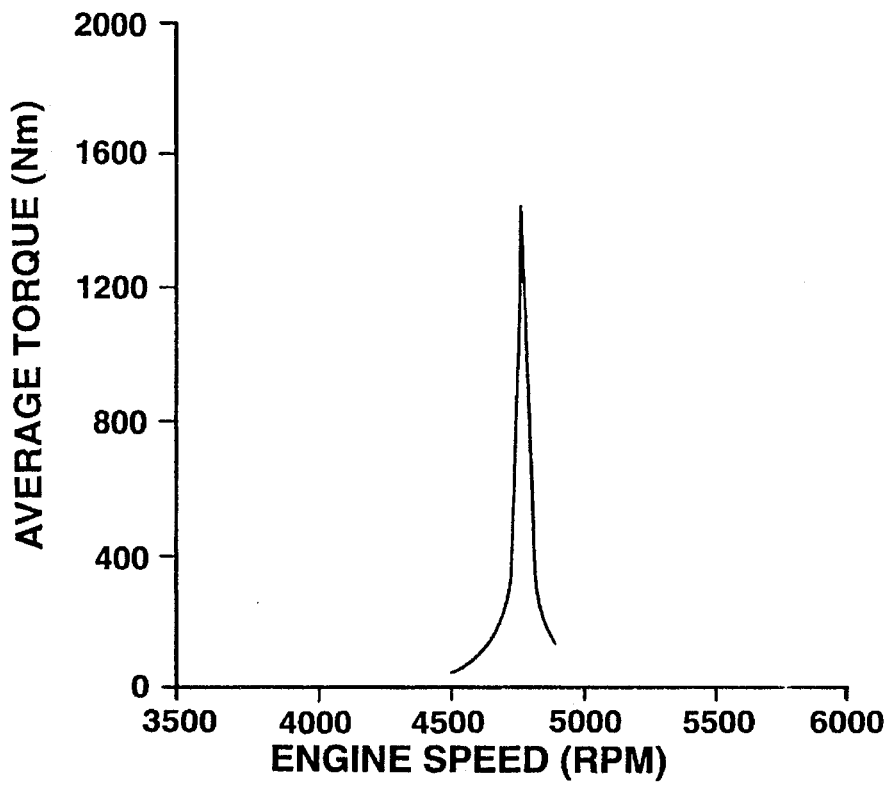
FIG. 4 is a graph produced by computer simulation of typical camshaft vibratory performance without a damper.
Figure 5:
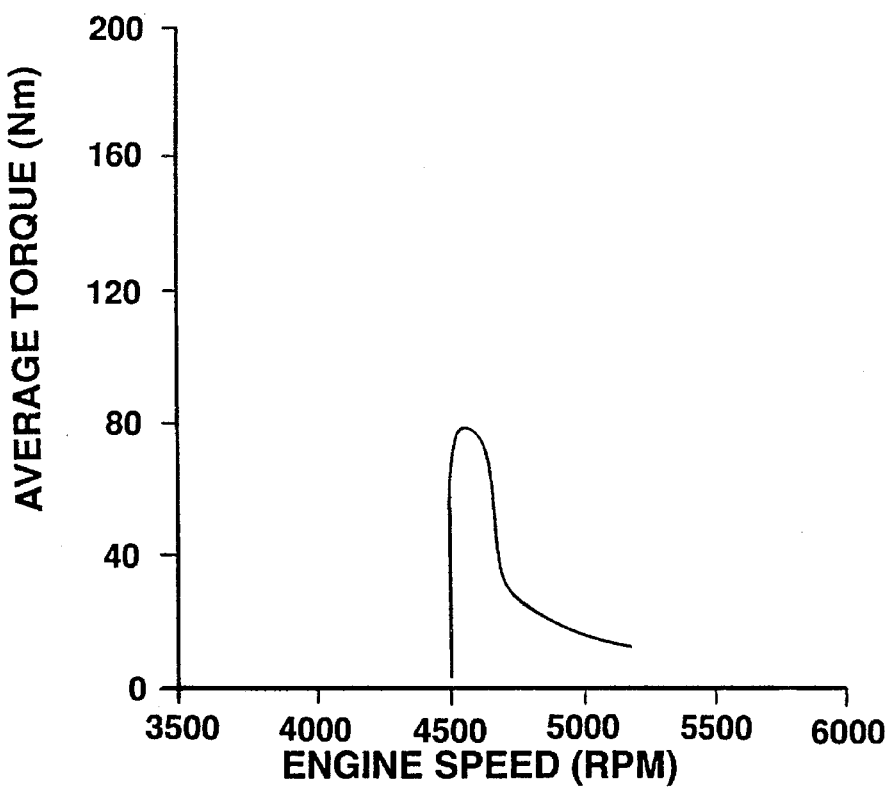
FIG. 5 is a graph produced by computer simulation of camshaft vibratory performance operating with a damper according to the present invention.

Referring now to FIGS. 4 and 5, both graphs present data regarding the vibratory performance of a typical camshaft damper assembly in an internal combustion engine of at least four cylinders. The graphs are produced by computer simulation and represent camshaft vibratory performance without damping in FIG. 4 and camshaft vibratory performance with a camshaft damper according to the present invention in FIG. 5. Comparison of the two graphs, noting particularly the expanded scale of FIG. 5, reveals the improvement achieved by the utilization of the camshaft damper assembly 60 by reducing dynamic loads at resonance.

FIG. 4, the baseline or control configuration lacking a damper, is modeled as a single degree of freedom system incorporating inertia, light damping and a spring. FIG. 5 presents data for the same system which has been modified by the incorporation of a camshaft damper assembly 60 according to the present invention.

TABLE I

| Variable | Without Damper (FIG. 4) | With Damper (FIG. 5) |
| --- | --- | --- |
| Inertia (Nm-Sec$^2$) | .002 | .001 |
| Damping Nm/rad/sec | .02 | — |
| Spring Rate (Nm/rad) | 5000 | — |
| Clutch Torque (Nm) | — | 20 |

Study of FIG. 4 reveals that the peak torque associated with the lightly system is 1500 Nm which occurs at an engine speed of 4800 R.P.M. A camshaft damper assembly 60 according to the present invention having a moment of inertia and clutch (friction) torque as specified above, produces not only significantly reduced peak torque, that is, 80 Nm at 4600 R.P.M., but also a harmonic response that is significantly less "peaky" or frequency sensitive.

It should be noted that the broadening of the torque peak, in addition to its reduction in magnitude, is a significant feature and benefit of the present invention. The camshaft damper assembly 60 of the present invention provides damping over a relatively broad range of frequencies which correlates to a relatively wide range of engine speeds and thus represents an improvement over many prior art harmonic dampers which achieve damping at either a specific frequency and engine speed or over a very narrow range of frequencies and engine speeds.

The mathematics for analyzing system performance and selecting specific design values for the general class of dampers known as Lanchester dampers having an inertia ring and friction torque coupling to a driving member, in which the present invention resides, are known. According to Den Hartog, ideal performance of such a damper can be achieved using the following two equations to determine the optimal damper inertia and friction torque for a given system:

TABLE II

| Variable | Value | Units |
| --- | --- | --- |
| System natural frequency | f - 250 | Hz |
| System inertia | I - .003 | Nm-sec$^2$ |
| System spring rate | k - 7390 | Nm/rad |
| Forcing function torque | T - 25.9 | Nm |
| Maximum system amplitude ratio at resonance | $P_{amp} = 14$ | DB |

The optimal damper inertia ($I_d$) is:

$$I_d = \frac{2.46 \cdot I}{10^{\frac{P_{amp}}{20}}}$$

and for the given variables is:

$I_d = 0.0015$ Nm-sec$^2$.

The optimal friction torque ($T_{opt}$) is:

$$T_{opt} = \sqrt{2} \cdot \pi^3 \cdot f^2 \cdot I_d \cdot \frac{T}{k}$$

and for the given variables is:

$T_{opt} = 14.1435$ Nm.

The foregoing presents the optimal values for the damper inertia and friction torque in a camshaft system characterized by the given variables. It should be understood that these values are by way of an example only. While they therefore represent typical values, actual values in a different given system will, of course, be different. Furthermore, specific and diverse performance goals may necessitate adjustment of such calculated values. Given typical camshaft configurations, it is anticipated that the inertia of the inertia ring 62 may be varied from approximately 0.0005 Nm-Sec$^2$ to 0.005 Nm-Sec$^2$ and possibly beyond these limits and that friction torque across the interface of the friction surface 34 and frictional material 74 may be varied between approximately 5 Nm and 50 Nm and possibly beyond these limits as well. It is expected, however, that given typical camshaft configurations utilized in motor vehicle engines, inertia of the inertia ring 62 will be in the range of 0.001 to 0.0025 Nm-Sec$^2$ and that friction torque across the clutch interface will be in the range of 10 Nm to 25 Nm.

The foregoing disclosure is the best mode devised by the inventors for practicing this invention. It is apparent, however, that devices incorporating modifications and variations will be obvious to one skilled in the art of internal combustion engines and vibration treatment. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. A camshaft damper assembly for reducing vibration associated with the rotation of a camshaft and the actuation of valves in an internal combustion engine comprising, in combination, a camshaft having at least a pair of cams for actuating a respective pair of valves, a drive sprocket secured to and rotating with said camshaft, said drive sprocket including teeth disposed about its periphery and a circular friction surface, an inertia ring rotatably disposed upon said camshaft adjacent said drive sprocket, said inertia ring having an inertia of between approximately 0.0005 Nm-Sec$^2$ and 0.005 Nm-Sec$^2$, friction material disposed between said drive sprocket and said inertia ring, and means for biasing said inertia ring toward said drive sprocket.

2. The camshaft damper assembly of claim 1 wherein said biasing means is a Belleville spring washer.

3. The camshaft damper assembly of claim 1 wherein said friction material is secured to said inertia ring.

4. The camshaft damper assembly of claim 1 further including a timing belt engaging and driving said teeth and said drive sprocket.

5. The camshaft damper assembly of claim 1 wherein said inertia ring defines a first, outer region axially offset from a second, inner region.

6. A damper assembly for disposition on a camshaft of an internal combustion engine comprising, in combination, a camshaft having cam means for actuating respective valve means, a clutch member secured to and rotating with said camshaft, said clutch member including teeth disposed about its periphery, and a planar friction surface rotating with said camshaft, an inertia ring disposed upon said camshaft adjacent said clutch member for rotation independent of said camshaft, said inertia ring having an inertia of between approximately 0.0005 Nm-Sec$^2$ and 0.005 Nm-Sec$^2$, friction material disposed between said clutch member and said inertia ring, and means for biasing said inertia ring toward said clutch member.

7. The damper assembly of claim 6 wherein said friction material is secured to said inertia ring.

8. The damper assembly of claim 6 wherein the inertia of said inertia ring is between 0.001 Nm-Sec$^2$ and 0.0025 Nm-Sec$^2$.

9. The damper assembly of claim 6 wherein friction torque between said clutch member and said inertia ring is between 10 Nm and 25 Nm.

10. The damper assembly of claim 6 wherein said biasing means is a Belleville spring washer.

11. The damper assembly of claim 6 said clutch member includes teeth disposed about its periphery further including a timing belt engaging and driving said teeth.

12. A Lanchester type damper for a camshaft of an internal combustion engine comprising, in combination, a camshaft having a plurality of cam means for actuating a respective one of a like plurality of valves, an inertia member disposed upon said camshaft for rotation independent of said camshaft, said inertia ring having an inertia of between approximately 0.0005 Nm-Sec$^2$ and 0.005 Nm-Sec$^2$, a drive member disposed adjacent said inertia member and secured to and rotating with said camshaft, a friction clutch including a friction surface disposed on one of said inertia member and drive member and friction material disposed on the other of said inertia member or drive member, and means for biasing said inertia member and said damper drive member together.

13. The Lanchester type damper of claim 12 wherein said means for biasing is a Belleville spring washer.

14. The Lanchester type damper of claim 12 wherein the inertia of said inertia member is between 0.001 Nm-Sec$^2$ and 0.0025 Nm-Sec$^2$.

15. The Lanchester type damper of claim 12 wherein friction torque between said drive member and said inertia member is between 10 Nm and 25 Nm.

16. The Lanchester type damper of claim 12 wherein said drive member is circular, defines a periphery and includes teeth disposed about said periphery and further including a timing belt engaging and driving said teeth.

17. The Lanchester type damper of claim 12 wherein said inertia member defines a first outer region axially offset from a second, inner region.

18. A camshaft damper assembly for reducing vibration associated with the rotation of a camshaft and the actuation of valves in an internal combustion engine comprising, in combination, a camshaft having at least a pair of cams for actuating a respective pair of valves, a drive sprocket secured to and rotating with said camshaft, said drive sprocket including teeth disposed about its periphery and a circular friction surface, an inertia ring rotatably disposed upon said camshaft adjacent said drive sprocket, friction material disposed between said drive sprocket and said inertia ring, and means for biasing said inertia ring toward said drive sprocket, wherein said friction torque between said inertia ring and said drive sprocket is between approximately 5 Nm and 50 Nm.

19. The camshaft damper assembly of claim 18 wherein said biasing means is a Belleville spring.

20. The camshaft damper assembly of claim 18 wherein said inertia ring defines a first, outer region axially offset from a second, inner region.

21. A damper assembly for disposition on a camshaft of an internal combustion engine comprising, in combination, a camshaft having cam means for actuating respective valve means, a clutch member secured to and rotating with said camshaft, said clutch member including teeth disposed about its periphery, and a planar friction surface rotating with said camshaft, an inertia ring disposed upon said camshaft adjacent said clutch member for rotation independent of said camshaft, friction material disposed between said clutch member and said inertia ring, and means for biasing said inertia ring toward said clutch member, wherein said friction torque between said inertia ring and said drive sprocket is between approximately 5 Nm and 50 Nm.

22. The damper assembly of claim 21 wherein said biasing means is a Belleville spring.

23. The damper assembly of claim 21 further including a timing belt engaging and driving said teeth.

24. A Lanchester type damper for a camshaft of an internal combustion engine comprising, in combination, a camshaft having a plurality of cam means for actuating a respective one of a like plurality of valves, an inertia member disposed upon said camshaft for rotation independent of said camshaft, a drive member disposed adjacent said inertia member and secured to and rotating with said camshaft, a friction clutch including a friction surface disposed on one of said inertia member and drive member and friction material disposed on the other of said inertia member or drive member, and means for biasing said inertia member and said damper drive member together, wherein said friction torque between said inertia ring and said drive sprocket is between approximately 5 Nm and 50 Nm.

25. The Lanchester type damper of claim 24 wherein said means for biasing is a Belleville spring.

26. The Lanchester type damper of claim 24 wherein said drive member defines a periphery and includes teeth disposed about said periphery and inertia member defines a first, outer region axially offset from a second, inner region.

* * * * *